United States Patent
Christie et al.

(10) Patent No.: US 6,421,344 B1
(45) Date of Patent: *Jul. 16, 2002

(54) ATM DIRECT ACCESS LINE SYSTEM

(75) Inventors: Joseph Michael Christie, deceased, late of San Bruno, CA (US); by Joseph S. Christie, legal representative; by Jean M. Christie, legal representative, both of Mt. Pleasant, PA (US); Albert D. Duree, Independence, MO (US); Michael Joseph Gardner, Overland Park, KS (US); Mark Sucharczuk, Mountain View, CA (US); William Lyle Wiley, Atlanta, GA (US)

(73) Assignee: Sprint Communications Company L.P., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/587,451

(22) Filed: Jun. 5, 2000

Related U.S. Application Data

(63) Continuation of application No. 08/594,662, filed on Feb. 2, 1996, now Pat. No. 6,172,977, which is a continuation-in-part of application No. 08/525,897, filed on Sep. 8, 1995, now Pat. No. 5,991,301, which is a continuation-in-part of application No. 08/238,605, filed on May 5, 1994, now abandoned.

(51) Int. Cl.$^7$ .............................................. H04L 12/28
(52) U.S. Cl. ...................... 370/395; 370/397; 370/523
(58) Field of Search ................. 370/395, 396, 370/397, 398, 410, 553, 384, 399, 377, 466, 465, 474, 522, 477, 472, 351, 352, 523, 385, 409, 230, 231

(56) References Cited

U.S. PATENT DOCUMENTS

| | | | |
|---|---|---|---|
| 4,720,850 A | 1/1988 | Oberlander et al. | |
| 4,730,312 A | * 3/1988 | Johnson | 370/523 |
| 4,763,317 A | 8/1988 | Lehman et al. | |
| 4,926,416 A | 5/1990 | Weik | |
| 5,051,983 A | 9/1991 | Kammerl | |
| 5,115,431 A | 5/1992 | Williams et al. | |
| 5,204,857 A | 4/1993 | Obara | |
| 5,327,421 A | 7/1994 | Hiller et al. | |
| 5,339,318 A | 8/1994 | Tanaka et al. | |
| 5,420,858 A | 5/1995 | Marshall et al. | |
| 5,422,882 A | 6/1995 | Hiller et al. | |
| 5,428,609 A | 6/1995 | Eng et al. | |
| 5,434,852 A | 7/1995 | La Porta et al. | |
| 5,452,296 A | 9/1995 | Shimizu | |
| 5,483,527 A | 1/1996 | Doshi et al. | |
| 5,509,010 A | 4/1996 | La Porta et al. | |

(List continued on next page.)

OTHER PUBLICATIONS

Shenoda et al., "A Method For Dynamic Gandwidth Allocation For Voice Trunking Using CES With CAS," ATM Forum Technical Committee 96–0136, Feb. 5, 1996.

Choi, Requirements for ATM Trunking, ATM Forum Technical Committee 95–1401, Oct. 2–6, 1995.

Okutani et. al. "VTOA: Reference Configuration—ATM Trunking For Narrowband Services," ATM Forum Technical Committee 95–1364, Oct. 2–6, 1995.

Caves, Proposed modifications to the baseline text (95–0446R2) of the "VTOA—ATM Trunking For Narrowband Services Specification," ATM Forum Technical Committee 95–1134, Oct. 2–6, 1995.

*Primary Examiner*—Douglas Olms
*Assistant Examiner*—Ricardo M. Pizarro
(74) *Attorney, Agent, or Firm*—Harley R. Ball; Steven J. Funk; Kevin D. Robb

(57) ABSTRACT

The invention is an ATM system to route DS0 traffic from T1 Extended Superframe (ESF)or Superframe (SF) systems that use robbed bit signaling. The invention is able to route the call selecting the ATM VPI/VCI that routes the call within the ATM system. DS0s with robbed bit signaling are transported transparently by the ATM system.

30 Claims, 2 Drawing Sheets

U.S. PATENT DOCUMENTS

| | | |
|---|---|---|
| 5,568,475 A | 10/1996 | Doshi et al. |
| 5,623,491 A | 4/1997 | Skoog |
| 5,673,262 A * | 9/1997 | Shimizu ................ 370/395 |
| 5,703,876 A | 12/1997 | Christie |
| 5,825,780 A | 10/1998 | Christie |
| 5,926,482 A | 7/1999 | Christie |
| 5,991,301 A | 11/1999 | Christie |
| 6,026,091 A | 2/2000 | Christie et al. |
| 6,172,977 B1 | 1/2001 | Christie et al. |
| 6,181,703 B1 | 1/2001 | Christie et al. |

* cited by examiner

ATM DIRECT ACCESS LINE SYSTEM

CROSS-REFERENCE TO RELATED APPLICATION

This application is a continuation of application Ser. No. 08/594,662, entitled "ATM Direct Access Line System" filed Feb. 2, 1996, now U.S. Pat. No. 6,172,977, which is a continuation-in-part of application Ser. No. 08/525,897 now U.S. Pat. No. 5,991,301, entitled "Broadband Telecommunications System," filed Sep. 8, 1995, which is a continuation-in-part of application Ser. No. 08/238,605, entitled "Method, System, and Apparatus for Telecommunications Control", filed May 5, 1994, and now abandoned. Application Ser. No. 08/594,662 and U.S. Pat. No. 5,991,301 are hereby incorporated by reference into this application.

BACKGROUND

At present there are telecommunications services available from telecommunications networks that require direct connection to the customer equipment. In some cases, a specific trunk or group of trunks connect a network switch to a customer switch and have attributes that are unique to that customer. These attributes include, but are not limited to, customized dialing plans, billing arrangements, virtual private networks, and specialized routing functions. These trunks and trunk groups are known as Dedicated Access Lines (DALs).

A single network switch may serve many DAL customers over a large geographical area. Typically, a switch located in one city may serve many DAL customers in another city. The customers in the other city may each share a common transmission facility in order to be connected to the network switch. The cost of the transmission facility is based on the quantity of circuits and the distance they are carried. Economic benefit is derived from minimizing the number of these circuits. In current systems, the DAL circuits are provided using the well known T1 Super Frame (SF) or T1 Extended Super Frame (ESF) format. Both SF and ESF transport customer traffic in the DS0 circuit.

At present, Asynchronous Transfer Mode (ATM) technology is being used to provide high speed transport for traffic carried by T1 ESF or SF. This ATM transport technique uses an ATM interworking multiplexer (ATM mux) to convert the DS0 traffic into ATM cells that can be transported over a broadband connection. At the terminating end of the broadband system, the ATM cells are re-converted back into DS0 format by another ATM mux for delivery to the destination system. Thus, DALs using SF or ESF may be transported over an ATM broadband connection by passing through ATM muxes.

Many of these DAL transport formats require the transmission of a continuous signal even when no user traffic is being transported. For example, a voice DS0 connection continuously transmits a 64,000 bit/second signal whether or not the DS0 connection is transporting any user traffic. This causes a problem in the above-described transport scenario. The ATM mux will convert the voice DS0 signal into ATM cells for transport, and since the DS0 signal is continuous, a continuous stream of ATM cells must be transported by the ATM network. This occurs even when no user traffic is being transported. The idle DS0 signal is still transported in ATM cells. When the voice DS0 is transported using SF or ESF format using robbed bit signaling, the idle state can be detected by monitoring the DS0's A and B signaling bits in the 6th and 12th frames of an SF or ESF. The state of the A and B bits indicates when the DS0 is active or off-hook and when the DS0 is idle or on-hook.

Currently, when a voice DS0 from an SF or ESF T1 using robbed bit signaling is converted to ATM cells, a continuous stream of ATM cells must be transported by the ATM broadband connection. This situation represents a waste of resources. At present, there is a need for an ATM system that can transport continuous signal voice robbed bit signaling formats when they carry user traffic, but not when they do not carry user traffic. Current solutions to this problem include the use of an ATM interworking multiplexer that detects robbed bit signaling and enables and disables associated VPI/VCI virtual connections. This solution is lacking because it is a point-to-point system, and there is no opportunity to exert control over the mux for the purpose of routing.

Currently, ATM Circuit Emulation Service and Virtual Trunking Service have been defined to transport a DS0 circuit within a T1 on ATM. These methods assume that the DS0 circuit is managed by out-of-band signaling (SS7 or PRI, etc.) and do not address the requirements of DS0 circuits that are managed by in-band robbed bit signaling. This requires T1 frame alignment to maintain the A, B, C & D signaling bits in the signaling frames. DS0 frame data entering the ATM system must remain frame aligned with the corresponding DS0 frame data that exits the ATM system.

F5 OA&M system management ATM cells are well known in the art. The OA&M cell header contains:

VPI=VPI of the DS0's ATM path

VCI=VCI of the DS0's ATM path

PTI=101 F5 end to end OA&M flow

Cell OA&M field: OAM type=System Management 1111

Cell OA&M field: Function type=0001 frame sync

User Data sent in the OA&M cell contains:

---

Octet 1
    AAL1 SAR PDU = Sequence number and Sequence number protection

Octet 2–5
    DS0 = Far end DS0 identifier
    [Mux id & DS0 id]

Octet 6
    Status = Status of this DS0 circuit
    [on-hook, off-hook, maint OOS, T1 Frame slip, T1 Frame Resync, Initial Frame Sync, etc]

Octet 7
    Frame # = Number of the T1 frame that first octet in the next user cell came from
    [1–12 SF or 1–24 ESF]

Octet 8
    Frame Type = This ends framing SF or ESF

Octet 9
    Signaling Type = This ends signaling type
    [Loop start, Ground start, Wink start, etc]

Octets 10–48 have been reserved for future use.

---

SUMMARY

The invention includes a telecommunications system for routing information in an asynchronous transfer mode (ATM) system with ATM cells that contain a virtual path identification/virtual channel identification (VPI/VCI), wherein the information is from a first DS0 in a first T1 Superframe/Extended Superframe (ESF/SF) system that uses robbed bit signaling and is routed by the ATM system to a second DS0 in a second T1 Superframe/Extended Superframe (ESF/SF) system that uses robbed bit signaling. The system comprises a first ATM interworking multiplexer that is operational to monitor the robbed bit signaling from the first ESF/SF system, to generate and transmit a message indicating an off-hook state, to receive a message identifying the first DS0 and the VPI/VCI, to convert the information from the first DS0 into ATM cells with the VPI/VCI, to generate an F5 OA&M cell containing the VPI/VCI and frame alignment information, and to transmit the ATM cells. The system comprises a second ATM interworking multiplexer that is operational to receive a message identifying the VPI/VCI and the second DS0, to receive the ATM cells with the VPI/VCI , to convert the ATM cells to information for the second DS0 using the frame alignment information, and to transmit the second DS0 to the second ESF/SF system. The system comprises a signaling processor that is operational to receive the message from the first ATM multiplexer, to select the VPI/VCI and the second DS0 in response to the off-hook state, to generate and transmit the message to the first ATM multiplexer identifying the first DS0 and the VPI/VCI, and to generate and transmit the message to the second ATM multiplexer identifying the second DS0 and the VPI/VCI. The system comprises a first link from the first ATM multiplexer to the signaling processor operational to transfer the messages, and a second link from the second ATM multiplexer to the signaling processor operational to transfer the message, and an ATM routing system that is operational to route the ATM cells between the first ATM multiplexer and the second ATM multiplexer based on the VPI/VCI.

In some embodiments the first ATM multiplexer and the second ATM multiplexer are operational to correct T1 slips, synchronization in frame alignment, and handle ATM cell loss. In some embodiments, the first ESF/SF system includes a first switch that sends a route request message to the telecommunications system, and the signaling processor that is operational to receive the route request message from the first switch and to select the first DS0, the VPI/VCI, and the second DS0 in response to the route request message

DETAILED DESCRIPTION

For purposes of clarity, the term "connection" will be used to refer to the transmission media used to carry user traffic. The term "link" will be used to refer to the transmission media used to carry signaling. On the Figures, connections are shown by a single line and signaling links are shown by double lines.

Figure 1:
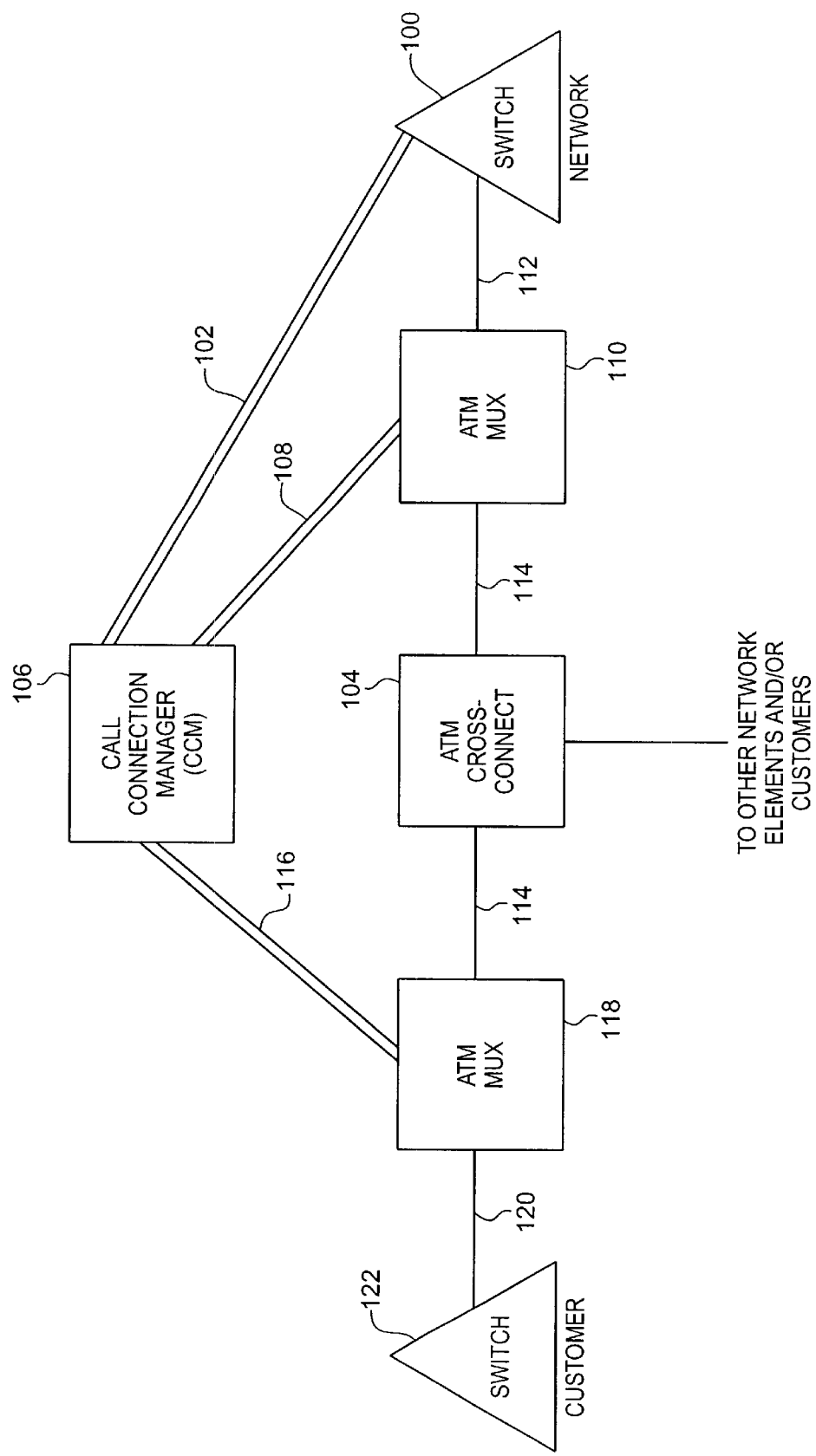
FIG. 1 is a block diagram of a version of the present invention.

FIG. 1 is a block diagram of a version of the present invention that supports outbound voice-band direct access line (DAL) traffic using SF or ESF framing with robbed bit signaling. Outbound traffic is traffic from the network switch and to the customer switch. Shown are switch 100, ATM interworking multiplexer (mux) 110, Connection Control Manager (CCM) 106, ATM interworking multiplexer (mux) 118, ATM cross-connect 104, and customer switch 122. These components are connected by connections 112, 114, and 120 and linked by links 102, 108 and 116 as shown. Those skilled in the art are aware that large networks have many more components than are shown, but the number of these components has been restricted for clarity. The invention is fully applicable to a large network.

Switches 100 and 122 are conventional circuit switches that transmit user voice-band traffic within continuous signals. Switch 100 is a network switch and switch 122 is a customer switch. Examples of continuous signals are SF or ESF framed DS0 signals that use in-band robbed bit signaling. Connections 112 and 120 are conventional T1 with SF or ESF transmission protocol that propagate continuous signals in order to transport user information. ATM connection 114 is comprised of conventional components that transport ATM cells. ATM cross-connect 104 is an ATM cross-connect device and virtual connection 114 is cross-connected through this device. Link 102 and is a conventional SS7 signaling link. One skilled in the art will know that Signal Transfer Points are used in the transfer of SS7 messages but for sake of clarity have not been included. Links 108 and 116 are conventional UDP/IP data links. The components mentioned in this paragraph are well known in the art. The invention is described in terms of Signaling System #7 (SS7), ESF/SF transmission with robbed bit signaling, and UDP/IP data links, but those skilled in the art will appreciate how the invention could be implemented with other signaling systems, transmission formats, and data transfer arrangements. ATM interworking muxes 110 and 118 are conventional SF/ESF/DS0 to ATM cell conversion devices except as they are modified in accord with the invention. One skilled in the art will appreciate these modifications from the following discussion.

CCM 106 is a signaling processor. It receives and processes messages from various network components, and generates and transmits messages to the network components. It has a signaling interface to exchange messages with switches and ATM muxes. Examples of these messages would be SS7 TCAP messages and UDP/IP messages. CCM 106 can process the messages and select a VPI/VCI based on various factors discussed below. CCM 106 also sets and tracks timers as discussed below. As will be appreciated, CCM 106 could be a single device, or distributed among multiple platforms.

As indicated, ATM cross-connect 104 is connected to other network elements and/or customers. ATM muxes 110 and 118 are capable of routing ATM cells to these other destinations based on the VPI/VCI assigned to the call by CCM 106. These options are not shown in greater detail for reasons of clarity. One skilled in the art will appreciate that muxes 110 and 118 could alternatively be connected back-to-back through a SONET system.

In one embodiment, the invention operates as follows for an outbound call coming from network switch 100. First, a transmit path must be set-up from switch 100. To initiate the transmit path, Switch 100 will execute the basic call model through the various points-in-call (PIC). Upon encountering the "Select Route" point-in-call, the switch will send an SS7 Transaction Capability Application Part (TCAP) Query to the CCM 106 requesting the identity of the outbound trunk group and trunk group member that will be used for this call. In this query, switch 100 will send information to CCM 106 that will allow it to determine the route for the call.

The TCAP query will contain the following information for use by CCM 106 to determine the route:
1. Called Number
2. Calling Number
3. Personal Identification Number
4. Account Code Number
5. Originating Trunk Group/Member 6. Authorization Code Number
7. Bearer Capability (User Service Information)
8. Other information (if deemed appropriate)

Based on all or part of the above listed items, CCM 106 will determine the correct path for switch 100 to route the call over. As indicated, CCM 106 could route the call to switch 122 or to any other destination available through cross-connect 104. This is a distinct advantage over prior systems transporting DAL traffic over ATM. These systems do not have this routing capability. For the sake of discussion, the selected path might be to switch 122. This path will typically be a DS0 circuit within connection 112, an ATM virtual connection within connection 114, and a DS0 within connection 120. The DS0s are designated by a trunk group number and a trunk member number. The ATM virtual connection is designated by a VPI/VCI. For the sake of clarity, the selected DS0 in connection 112 will be referred to as DS0 112, the selected VPI/VCI in connection 114 will be referred to as VPI/VCI 114, and the selected DS0 in connection 120 will be referred to as DS0 120. It should be noted that connections 112, 114, and 120 carry multiple DS0s and VPI/VCIs.

It should be noted that a VPI/VCI is unidirectional and DS0s are bi-directional. For a bi-directional call, two VPI/VCIs in opposing directions are required to support the bi-directional DS0s. Typically, corresponding VPI/VCIs in each direction will be assigned to each other. For the sake of clarity, the term VPI/VCI will be used to indicate both of these virtual connections—a bi-directional virtual connection.

Based on the TCAP processing, CCM 106 will instruct switch 100 of its selections in a TCAP response. Both the query and the response will be transmitted over link 102. The response to switch 100 will identify DS0 112 for use on the outbound call. CCM 106 will also send messages to muxes 110 and 118 over links 108 and 116 instructing them that a call is pending. The message to muxes 110 and 118 will identify the pending off-hook connection—DS0 112, VPI/VCI 114, and DS0 120. CCM 106 will also set an off-hook timer for DS0 112. If the timer expires before an off-hook message is received for DS0 112, CCM 106 will invoke a disconnect procedure and clear the call attempt.

When the call goes-off hook at switch 100, robbed bit signaling is used in the conventional manner to alert ATM mux 110. When ATM mux 110 detects the off-hook robbed bit signal from switch 100, it sends an off-hook status for DS0 112 to CCM 106. CCM 106 records the off-hook for DS0 112 and clears the off-hook timer for DS0 112. CCM 106 will now set a sync timer for associated DS0 120. If the timer expires before a sync message is received for DS0 120, CCM 106 will invoke disconnect procedures and clear the call attempt.

In addition, when ATM mux 110 detects the off-hook condition, ATM mux 110 maps DS0 112 to associated VPI/VCI 114 and begins sending cells. ATM cross-connect 104 routes these cells to ATM mux 118. Had CCM 106 assigned another VPI/VCI to the call provisioned to another destination, ATM cross-connect would have routed the cells to this destination. This allows the invention to route DAL traffic on a call by call basis.

The first cell will be an F5 OA&M system management cell that contains following information:

| | |
|---|---|
| Far End DS0 ID - | (ATM MUX 118) + (DS0 120) |
| First User Cell SN - | Sequence number of the first user cell |
| Near End Status - | (A bit = 1/0) (B bit = 1/0) (C bit =1/0 or *) (D bit = 1/ or *) where * is don't care (Off-hook) |
| Near End Frame # - | T1 Frame number that first octet in first user cell came from |
| Near End frame format - | SF or ESF |
| Near End Signal Type - | Ground Start, Loop Start, Wink Start, Immediate dial, etc. |

ATM mux 118 (which has already received a pending activate command from CCM 106) receives the OA&M cell. The user cells follow. When the first user cell is received, ATM mux 118 uses the frame information received in the OA & M cell to align the DS0 octets in the cell to the same outgoing T1 frame numbers. ATM mux 118 must maintain a cell frame pointer that identifies the correct frame number in the outgoing T1 for each octet in a cell. ATM mux 118 then sends a sync message for DS0 120 to CCM 106 via link 116. CCM 106 receives the sync message and clears the sync timer for DS0 120. CCM 106 also sets the status for DS0 120 to "in sync". CCM 106 then sets an off-hook timer for the DS0 120. If the timer expires before an off-hook response is received for DS0 120, CCM 106 will invoke the disconnect procedure and clear the call attempt.

ATM mux 118 maps the cells from VPI/VCI 114 to DS0 120. DS0 120 will have an off-hook state in its robbed bit signaling. At this point, a transmit path has been arranged from switch 100 to switch 122. Also, DS0 112 has been transported transparently through the ATM system to become DS0 120. This includes the robbed bit signaling associated with DS0 112. The next action is for switch 122 to respond to the off-hook on DS0 120 (and DS0 112) and initiate the receive path from switch 122 to switch 100. Before, continuing with the receive path, a discussion of frame alignment will be helpful.

Frame alignment is required so the robbed bit signaling can be positioned in the correct frames of DS0 120 by ATM mux 118. Each cell will contain a minimum of 3–4 SFs or 1–2 ESFs for DS0 112. This means that each cell contains robbed bit signaling information. If frame alignment is not maintained between DS0 112 and DS0 120, the robbed bit signaling would be lost. This seriously effects the ability to use DS0 120. Robbed bit signaling uses the low order bit of the DS0 octet in the sixth and twelfth frame of the T1 SF or ESF format. For ESF, T1 s normally repeat the A and B bit signal in the C and D bit position (18th and 24th frames). Maintaining frame alignment is also the reason that procedures are required for frame slips and error conditions that cause frame resynchronization. These procedures are described in a later sections of this document.

In addition to the transmit path, a receive path will also be set-up from switch 122 to switch 100. Switch 122 initiates this by responding to the off-hook on DS0 120. When ATM mux 118 detects an off-hook response from switch 122 for DS0 120, it sends an off-hook status to CCM 106 via control link 116. CCM 106 records the off-hook state for DS0 120 and clears the off-hook timer for DS0 120. CCM 106 then sets a sync timer for associated DS0 112. If the timer expires before a sync message is received for DS0 112, CCM 106 will invoke the disconnect procedure and clear the call attempt.

ATM mux 118 maps DS0 120 to VPI/VCI 114 and begins sending cells. The first cell to be sent is an F5 OA&M system management cell that contains following information:

Far End DS0 ID—(ATM MUX 110)+(DS 112)

First User Cell SN—Sequence number of the first user cell

Near End Status—(A bit=1/0 *) (B bit=1/0) (C bit=1/0 or *)

(D bit=1/or *) where * is don't care
(Off-hook)

Near End Frame #—T1 Frame number that first octet in first user cell came from

Near End frame format—SF or ESF

Near End Signal Type—Ground Start, Loop Start, Wink Start, Immediate dial, etc.

ATM MU 110 receives the OA&M cell for VPI/VCI 114. As discussed, this is actually a return VPI/VCI for the receive path, but it is designated simply as VPI/VCI 114 for clarity. When the first user cell is received, ATM MUX 110 uses the frame information received in the OA & M cell to align the DS0 octets in the cell to the same outgoing T1 frame numbers. ATM MUX 110 must maintain a cell frame pointer that identifies the correct frame number in the outgoing T1 for each octet in a cell. ATM MUX 110 then sends a sync message for DS0 112 to CCM 106 via link 108. CCM 106 receives the sync message and clears the sync timer for DS0 112 and sets the status for DS0 112 to "in sync". CCM 106 sets the status of the return VPI/VCI 114 to "connected". It can be seen from the above discussion that DS0 112 is mapped to a bi-directional virtual connection represented by VPI/VCI 114, and this virtual connection is mapped to DS0 120. As such, a bidirectional communications path with robbed bit signaling has been established over the outbound DAL from the network (switch 100) to the customer (switch 122).

Another version of the invention supports inbound voiceband direct access line (DAL) traffic using SF or ESF framing with robbed bit signaling. Inbound traffic is traffic from the customer (switch 122) to the network (switch 100). When a connection is desired, switch 122 will go off-hook on DS0 120. When ATM MUX 118 detects the off-hook robbed bit signal from switch 122, it sends an off-hook status for DS0 120 via control link 116 to CCM 106. CCM 106 records the off-hook for DS0 120 and sets a sync timer for DS0 112. If the timer expires before a sync message is received for DS0 112, CCM 106 will invoke a disconnect procedure and clear the call attempt.

CCM 106 could select the VPI/VCI based on many factors, such as the identity of the customer, the DS0, time of day, emergency conditions, etc. One skilled in the art will appreciate other routing factors. For the sake of the discussion, CCM 106 might select VPI/VCI 114 to switch 100. It can be seen that, by selecting another VPI/VCI, ATM cross-connect 104 could route the call to other network elements or customers. CCM 106 will send an activate message for DS0 120 to ATM mux 118 via signaling link 116. The message identifies DS0 120, VPI/VCI 114, ATM MUX 110, and DS0 112. CCM 106 will also send an activate message to ATM mux 110 via signaling link 108 identifying DS0 120, ATM mux 118, VPI/VCI 114, and DS0 112.

ATM MUX 118 maps DS0 120 to VPI/VCI 114 and begins sending cells. The first cell to be sent is an F5 OA&M system management cell that contains following information:

Far End DS0 ID—(ATM MUX 110)+(DS0 112)

First User Cell SN—Sequence number of the first user cell

Near End Status—(A bit=1/0) (B bit=1/0) (C bit=1/0 or *)
(D bit=1/ or *) where * is don't care
(Off-hook)

Near End Frame #—T1 Frame number that first octet in first user cell came from

Near End frame format—SF or ESF

Near End Signal Type—Ground Start, Loop Start, Wink Start, Immediate dial, etc.

ATM MUX 110 receives the OA&M cell for VPI/VCI 114. User cells follow. When the first user cell is received, ATM MUX 110 uses the frame information received in the OA & M cell to align the DS0 octets in the cell to the same outgoing T1 frame numbers. ATM MUX 110 must maintain a cell frame pointer that identifies the correct frame number in the outgoing T1 for each octet in a cell. ATM MUX 110 then sends a sync message for DS0 112 to CCM 106 via link 108. CCM 106 receives the sync message for DS0 112, clears the sync timer, and sets the status to "in sync". CCM 206 sets an off-hook timer for DS0 112. If the timer expires before an off-hook message is received for DS0 112, CCM 106 will invoke the disconnect procedure and clear the call attempt.

In addition to the transmit path, a receive path will also be set-up from switch 100 to switch 122. Switch 100 will respond to the off-hook on DS0 112 to establish the receive path. When ATM MUX 110 detects an off-hook response signal from switch 100, it sends an off-hook status for DS0 112 via control link 108. CCM 106 records the off-hook status for DS0 112 and clears the off-hook timer for DS0 112. CCM 106 also sets a sync timer for DS0 120. If the timer expires before a sync message is received for DS0 120, CCM 106 will invoke the disconnect procedure and clear the call attempt.

ATM MUX 110 maps DS0 112 to VPI/VCI 114 and begins sending cells. The first cell to be sent is an F5 OA&M system management cell that contains following information:

Far End DS0 ID—(ATM MUX 118)+(DS0 120)

First User Cell SN—Sequence number of the first user cell

Near End Status—(A bit=1/0) (B bit=1/0) (C bit=1/0 or *)
(D bit=1/ or *) where * is don't care
(Off-hook)

Near End Frame #—T1 Frame number that first octet in first user cell came from

Near End frame format—SF or ESF

Near End Signal Type—Ground Start, Loop Start, Wink Start, Immediate dial, etc.

ATM MUX 118 receives the OA&M cell for VPI/VCI 114. User cells follow. When first user cell is received ATM MUX 118 uses the frame information received in the OA & M cell to align the DS0 octets in the cell to the same outgoing T1 frame numbers. ATM MUX 118 must maintain a cell frame pointer that identifies the correct frame number in the outgoing T1 for each octet in a cell. ATM MUX 118 then sends a sync message for DS0 120 to CCM 106 via link 116. CCM 106 receives the sync message, clears the sync timer, and sets the status to "in sync" for DS0 120. CCM 106 sets the status of return VPI/VCI 114 to "connected". It can be seen from the above discussion that DS0 120 is mapped to a bi-directional virtual connection represented by VPI/VCI 114, and this virtual connection is mapped to DS0 112. As such, a bi-directional communications path has been established over the inbound DAL from the customer (switch 122) to the network (switch 100). In addition, CCM 106 has the opportunity select a route for the call commensurate with the customers routing plan.

Glare occurs when an attempt is made to use the same DS0 for calls in different directions—inbound and outbound—at the same time. In this embodiment, the originating and terminating switches are expected to resolve a glare condition. At the ATM mux, any wink start signal over 350 milliseconds can be flagged as a glare condition. The following figures are glare conditions for some commercially available switches:

| | |
|---|---|
| DMS-10 | wink start 400 to 500 ms |
| DMS-100F | wink start 350 ms adjustable 10–2550 ms |
| 4 ESS | wink start 350–400 ms |
| 5 ESS | wink start 400–500 ms |

At the ATM MUX, any start dial delay intervals that exceed 4 seconds can be flagged as a glare condition. One skilled in the art knows actual glare detection times for different manufacturers switching equipment will vary.

The ATM MUX may detect glare but does not resolve a glare condition. When the CCM sees both an outbound and inbound call request (off-hook) for the same DS0 prior to the "connected" state, it either: 1) proceeds with the inbound off-hook request (customer switch) and disregards the outbound request, 2) proceeds with the outbound off-hook request (network switch) and disregards the inbound request, or 3) blocks the MUX activation in both directions and initiates the network disconnect procedure to reset the DS0 in each MUX. This will cause an off-hook timeout in the switches.

Referring again to FIG. 1, glare resolution is discussed. Glare detection occurs at the each end of the communications path in the switch. A scenario where the network switch yields follows. Switch 100 detects glare by timing the incoming wink start or delay dial signal. When the maximum time for the appropriate signal is exceeded, glare is assumed by switch 100. After detecting the glare condition, switch 100 goes on hook towards switch 122, and the incoming call from switch 122 to switch 100 will be completed on its intended trunk group member. The call outgoing from switch 100 toward switch 122 will be retried by switch 100 on another trunk. Switch 100 must requery the CCM over signaling link 102 to obtain an alternate trunk group member for the call blocked by glare. The scenario for the customer switch 122 to yield is similar to the above scenario except that the switch does not need to query CCM 106 since it only seizes a DS0 into the network anyway. When selecting connections, it is desirable for CCM 106 to hunt for an available DS0 on a two way trunk group by selecting trunk group members from the opposite directions to minimize the number of glare conditions.

Disconnect procedures are now discussed. The procedures are similar for a disconnect initiated from either end, and disconnect from the network will be discussed. If disconnect occurs from the network side, ATM MUX 110 will receive an on-hook robbed bit signal from switch 100. ATM mux 110 will send CCM 106 an on-hook status for DS0 112 via signaling link 108. ATM MUX 110 samples the SF or ESF A and B bits in the next superframe or extended superframe and sends the status of the A & B bits to CCM 106. CCM 106 records the on-hook status for DS0 112, and if a set number (default=2) of consecutive status messages report on-hook for DS0 112, CCM 106 sends an instruction to deactivate DS0 112 and associated VPI/VCI 114 to ATM MUX 110 via control link 108. CCM 106 sends an instruction to deactivate DS0 120 and associated VPI/VCI 114 to ATM MUX 118 via control link 116.

CCM 106 sets the status of VPI/VCI 114 to "disconnected". It can be seen from the above discussion that DS0 120 is no longer mapped to a bi-directional virtual connection represented by VPI/VCI 114, and this virtual connection is no longer mapped to DS0 112. As such, the bi-directional communications path between customer (switch 122) and network (switch 100) is removed. One skilled in the art will recognize that a disconnect from the customer switch is handled in a similar fashion.

There are several timers that invoke the network disconnect procedure. If one of the timers expires during the call, CCM 106 sends a deactivate message to both ATM mux 110 and 118. ATM MUX 110 sets DS0 112 A & B bits (C and D for ESF) to the on-hook state. ATM MUX 118 sets DS0 120 A & B bits (C and D for ESF) to the on-hook state. CCM 106 makes DS0 120 and DS0 112 unavailable for a set number of minutes (default two minutes). After the time expires, CCM 106 sends a message to ATM MUX 118 requesting DS0 120 status and a message to ATM MUX 110 requesting DS0 112 status. If ATM MUX 110 returns an on-hook state for DS0 112 to CCM 106, CCM 106 returns DS0 112 to the available state. If ATM mux 118 returns an on-hook state for DS0 120 to CCM 106, CCM 106 returns DS0 120 to an available state. The above process may be repeated until an on-hook status is returned, Frame synchronization is now discussed. One skilled in the art knows that loss of T1 frame synchronization can be very short (2–4 milliseconds) or very long (100–250 milliseconds) in respect to the time it takes to fill an ATM cell for a 64 Kbit/second DS0 (6 milliseconds). When the frame is resynchronized, the bit alignment of the slots and frame alignment maybe offset in time in respect to the bytes being entered into the ATM cell. In some cases, they may align so as to have only a set number of lost frame octets during the resynchronization of the T1 frame. The ATM MUX must manage either of these conditions.

When the T1 for DS0 at either end loses frame synchronization, it must be resynchronized. The local ATM MUX detects loss of frame synchronization and informs the far end ATM MUX by sending an F5 OA&M system management cell that indicates that a loss of frame synchronization has occurred. The F5 OA&M system management cell contains the following information:

Far End DS0 ID—(ATM MUX #)+(DS0 #)

User Cell SN—Sequence number of the user cell being filled when frame sync was lost Near End Status—(A bit=1/0) (B bit=1/0) (C bit=1/0 or *) (D bit=1/ or *) where * is don't care
(loss synchronization)

Near End Frame #—T1 Frame number of the first octet that white noise was inserted in.

Near End frame format—SF or ESF

Near End Signal Type—Ground Start, Loop Start, Wink Start, Immediate dial, etc.

The ATM MUX that detects the loss of frame synchronization will send a signaling message to CCM 106 that indicates an out of frame sync condition has occurred for the local DS0. The ATM MUX begins inserting white noise for the octets remaining in the current cell being filled. If current cell becomes full, it is sent, and the ATM MUX begins filling the next cell with white noise. The ATM MUX will continue inserting white noise bytes for the missing frames.

When the far end ATM MUX receives the loss sync message, it maintains the last setting of the A & B (C & D) signaling bits in the 6th and 12th frames (and 18th and 24th for ESF) received in the OA&M message. This condition will continue until the end that detected the loss of frame synchronization regains frame synchronization and detects good data from the resynchronized T1 for the associated DS0. When the T1 is resynchronized and good data bytes are again being received, the ATM MUX looks at the current frame number of the next byte to be placed in the current cell. If the frame number of the byte from the T1 framer matches the frame number of the current position in the cell being filled, the byte is placed into the cell and the ATM MUX continues filling the cell from the data received from the T1 framer.

The ATM MUX sends a set number of Resync messages (default n=2) to the far end ATM MUX. The F5 OA&M system management cell contains the following information:

Far End DS0 ID—(ATM MUX #)+(DS0 #)

User Cell SN—Sequence number of the user cell being filled when frame Resync occurred Near End Status—(A bit=1/0) (B bit=1/0) (C bit=1/0 or *) (D bit=1/ or *) where * is don't care (Resynchronization)

Near End Frame #—T1 Frame number of the first octet in the cell

Near End frame format—SF or ESF

Near End Signal Type—Ground Start, Loop Start, Wink Start, Immediate dial, etc.

When the T1 is resynchronized and good date bytes are again being received, the ATM MUX looks at the current frame number of the next byte to be placed in the current cell. If the frame number of the byte from the T1 framer does not match the frame number of the current position in the cell being filled the ATM MUX writes the first good byte from the framer into the first octet of the current cell.

The ATM MUX sends a set number of resync messages (default n=2) to the far end ATM MUX. The F5 OA&M system management cell contains the following information:

Far End DS0 ID—(ATM MUX #)+(DS0 #)

User Cell SN—Sequence number of the user cell being filled when frame Resync occurred Near End Status—(A bit=1/0) (B bit=1/0) (C bit=1/0 or *) (D bit=1/ or *) where * is don't care (Resynchronization)

Near End Frame #—T1 Frame number of the first octet in the cell

Near End frame format—SF or ESF

Near End Signal Type—Ground Start, Loop Start, Wink Start, Immediate dial, etc.

The far end ATM MUX receives a resynchronization OA&M message and uses the Sequence Number and Frame Number information to determine if it has to fill octets for some number of frames with white noise until it can realign its cell data to the correct frame number. Buildout at far end will have to be adjusted when the receive frame number in the first octet and cell frame pointer are not aligned due to the lost octets in the cell that was over written. The far end ATM MUX will send a signaling message to CCM 106 that indicates a resynchronization has occurred for the DS0 connection.

Frame slip is now discussed with reference to FIG. 2. One skilled in the art knows that T1 frame slips are a common occurrence in a network. When the T1 interface for a DS0 connection has a frame slip, the ATM MUX must insure that the resulting loss of an octet or duplication of an octet is accounted for in the ATM cell to maintain the T1 frame alignment at the far end DS0 interface. The ATM MUX must also insure that the cell transmit rate does not exceed the Network DS0 clock rate.

Commercially available T1 framer chips use slip buffers to handle the clock difference between the loop timed receive clock and the network DS0 clock reference. T1 frame slips could causes the signaling frame octets to be lost or mis-aligned in the cell which would mis-align the signaling information being carried to the far end ATM MUX within the cell data.

Figure 2:
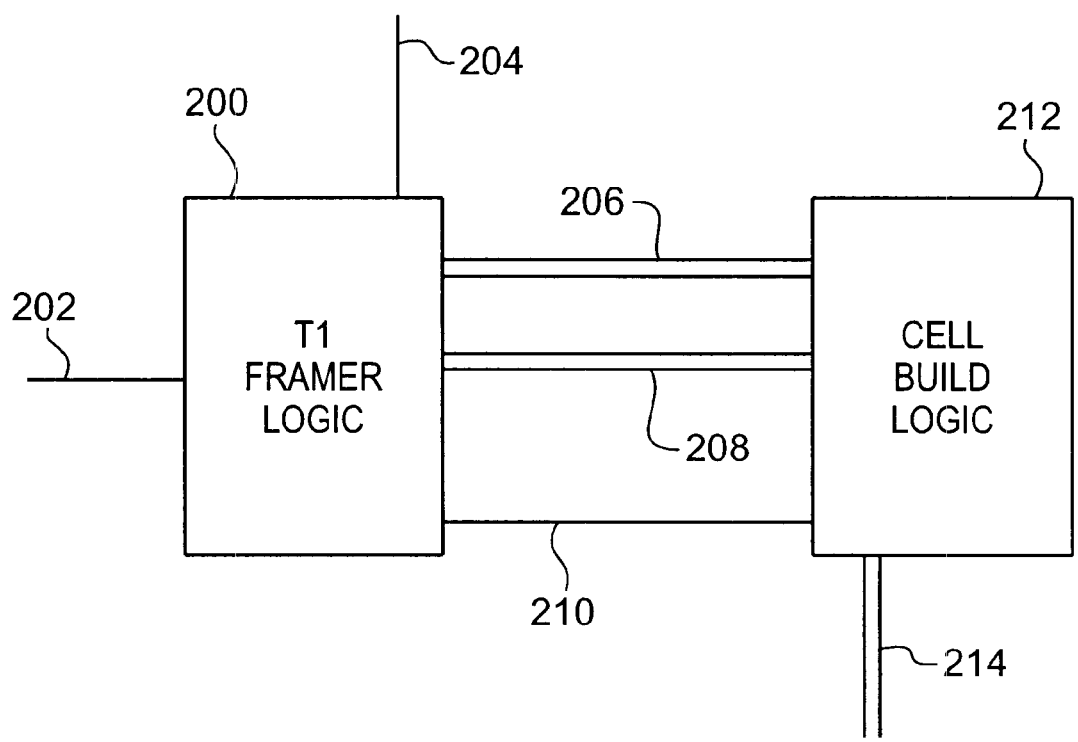
FIG. 2 is a block diagram of a version of the present invention.

FIG. 2 depicts T1 framer logic 200 and cell build logic 212. The connections and links are:

| | |
|---|---|
| connection 202 - | T1 receive data and recovered receive clock input |
| connection 204 - | ATM MUX Network clock reference input (stratum one) |
| link 206 - | Framer logic frame information outputs (beginning of superframe, frame and T1 slots etc.) |
| link 208 - | Framer logic frame slip and resync information outputs |
| connection 210 - | Framer logic frame data octet output |
| link 214 - | Status CCM LINK |

To address this problem, the T1 framer logic 200 detects a frame slip due to either a receive clock overrun or underrun and adjusts its output by skipping a frame or repeating a frame. DS0 slots within a frame will be deleted or repeated. Cell build logic 212 will insert signaling bits into the signaling frame octets based on information obtained from the T1 framer logic 200.

An overrun condition is when the sending T1 interface is clocked faster than the ATM MUX receive network clock reference (i.e.: stratum one) This condition will cause the receive T1 interface framer logic 200 to eventually slip a frame and lose an octet of receive data. This permits the received bits to slide out for 193 clock times before it requires correction. One skilled in the art knows that there are many implementations of T1 framers and each implementation handles overrun slip somewhat differently. When the overrun occurs it can cause the data octet put in the cell to be out of frame alignment and consequently signaling bit information would be put in the wrong octet in this or subsequent cells.

In the example below frame six was overran by frame seven and frame information is shifted by one octet.

| | RECEIVED DATA | | CELL DATA |
|---|---|---|---|
| | referenced to loop timed clock | | referenced to network (stratum one) clock |
| | Frame 1 | | Frame 1 |
| | Frame 2 | | Frame 2 |
| | Frame 3 | | Frame 3 |
| | Frame 4 | | Frame 4 |
| | Frame 5 | | Frame 5 |
| Frame six data lost | Frame 6s | * | Frame 7 |
| | Frame 7 | | Frame 8 |
| | Frame 8 | | Frame 9 |
| | Frame 9 | | Frame 10 |
| | Frame 10 | | Frame 11 |
| | Frame 11 | | Frame 12s |
| | Frame 12s | | Frame 1 |

To correct the frame alignment in the cell, the ATM MUX cell build logic 212 will insert the octet from frame seven into the cell for frame six. Based on the information it obtains from T1 framer 200 via information outputs 206 and 208, the cell build logic will adjust the insertion of signaling information bits into the cell data. This is to make the affected frame data look like signaling frame six to the far end T1 interface. The Cell build logic adjusts its cell frame pointer so subsequent signaling frames will align with the far end T1 interface. Two things happen on overrun, the cell is delayed from being sent by 125 microseconds to adjust it to the network clock rate, and one octet of user data is lost.

If the cell was not delayed 125 microseconds for an overrun slip (i.e.: frame 6 was padded with white noise and signaling bit was inserted) cell data at the far end would arrive faster than it could be emptied. If underrun slips went on long enough cell buffering for the transmit port would be exhausted.

|  | RECEIVED DATA | CELL DATA |
| --- | --- | --- |
|  | referenced to loop timed clock | referenced to network (stratum one) clock |
|  | Frame 1 | Frame 1 |
|  | Frame 2 | Frame 2 |
|  | Frame 3 | Frame 3 |
|  | Frame 4 | Frame 4 |
|  | Frame 5 | Frame 5 |
| Frame six data lost | Frame 7 | * Frame 7 data +(Signaling bit) inserted for Frame 6s |
|  | Frame 8 | Frame 7 |
|  | Frame 9 | Frame 8 |
|  | Frame 10 | Frame 9 |
|  | Frame 11 | Frame 10 |
|  | Frame 12s | Frame 11 |
|  | Frame 1 | Frame 12s |

An underrun condition is when the sending T1 interface is clocked slower than ATM MUX network clock reference 204 (i.e.: stratum one) This condition will cause the receive T1 interface framer to eventually slip a frame and duplicates one octet of receive data. In this case the octet did not arrive quick enough and had to be substituted with an octet from the previous frame. One skilled in the art knows that there are many implementations of T1 framers and each implementation handles underrun slip somewhat differently. When underrun occurs, it causes the subsequent data octets put in the cell to be out of frame alignment and signaling bit information is lost if the duplicated octet was in a signaling frame.

In the example below frame six underran and frame five information was repeated in its place.

| RECEIVED DATA | CELL DATA |
| --- | --- |
| referenced to loop timed clock | referenced to network (stratum one) clock |
| Frame 1 | Frame 1 |
| Frame 2 | Frame 2 |
| Frame 3 | Frame 3 |
| Frame 4 | Frame 4 |
| Frame 5 | Frame 5 |
| Frame 6s | * Frame 5 |
| Frame 7 | Frame 6 |
| Frame 8 | Frame 7 |
| Frame 9 | Frame 8 |
| Frame 10 | Frame 9 |
| Frame 11 | Frame 10 |
| Frame 12s | Frame 11 |

To correct underrun ATM MU cell build logic 212 inserts previous frames' octet into the cell for the late frame information. If the late octet is a signaling bit octet, the signaling bit is recovered from the previous superframe's data and inserted. In this case the cell build logic will adjust the insertion of signaling information bits into the cell and maintain the rate of sending cells to match network DS0 clock reference 204.

| RECEIVED DATA | CELL DATA |
| --- | --- |
| referenced to loop timed clock | referenced to network (stratum one) clock |
| Frame 1 | Frame 1 |
| Frame 2 | Frame 2 |
| Frame 3 | Frame 3 |
| Frame 4 | Frame 4 |
| Frame 5 | Frame 5 |
|  | * Frame 5 octet +(Signaling bit) |
|  | Frame 6s |
| Frame 6 | Frame 7 |
| Frame 7 | Frame 8 |
| Frame 8 | Frame 9 |
| Frame 9 | Frame 10 |
| Frame 10 | Frame 11 |
| Frame 11 | Frame 12s |
| Frame 12 | Frame 1 |

When ATM MUX cell build logic 212 detects a frame slip, it will send a signaling message via CCM link 214 to the CCM. The message will indicate a frame slip has occurred for a DS0 and whether it was due to overrun or underrun. This enables the CCM to manage the DS0 circuit Quality of Service.

When a cell is lost, the MUX that detects the missing cell must send white noise octets for the lost frame positions in the lost cell, and maintain the last received A & B bit states in the 6th and 12th (and 18th and 24th for ESF) frame octets that were lost in the cell. The ATM MUX is assumed to be using one of the ITU-T sequence number check methods. The sequence number values can range from 0 to 7. When more than one cell is lost, the MUX will determine the number of missing cells. The ATM MUX sends white noise octets for the lost frame positions in the lost cells and maintain the last received A & B bit states in the 6th and 12th (and 18th and 24th for ESF) frames that were lost in the cells. This requires that the ATM MUX implement a method of timing the duration between the last received good cell's sequence number and the next received good cell's sequence number. If the time between good cells is greater than 6 cell times, the ATM MUX must calculate the number of lost cells based on the timed duration. This is required to manage the circuit during a SONET reroute where more than 7 cells may be lost. If the time between good cells is less than 6 cell times, the ATM MUX calculates the number of lost cells based on the difference between the last good sequence number and the current one. If the time between good cells is greater than 6 cell times, the ATM MUX calculates the number of lost cells based on the time difference. One skilled in the art knows various ways that this timer can be implemented.

Alarms may also be sent. An ATM MUX will send an unsolicited message informing the CCM when a red, yellow or blue alarm condition is detected on a T1 . An ATM MUX would also send end-to-end F5 flow messages to the far end ATM MUX for the VPI/VCI connection affected by a red, yellow, or blue T1 alarm. These alarms are known in the art.

In addition to these embodiments, other variations will be appreciated by those skilled in the art. As such, the scope of the invention is not limited to the specified embodiments, but is only restricted to the following claims.

What is claimed is:

1. A telecommunications system for routing information in an asynchronous transfer mode (ATM) system with ATM cells that contain a virtual path identification/virtual channel identification (VPI/VCI), wherein the information is from a first DS0 in a first T1 Superframe/Extended Superframe (ESF/SF) system that uses robbed bit signaling and is routed by the ATM system to a second DS0 in a second T1 Superframe/Extended Superframe (ESF/SF) system that uses robbed bit signaling, wherein the system comprises;

a first ATM interworking multiplexer that is operational to monitor the robbed bit signaling from the first ESF/SF system, to generate and transmit a message indicating an off-hook state, to receive a message identifying the first DS0 and the VPI/VCI, to convert the information from the first DS0 into ATM cells with the VPI/VCI, to generate an F5 OA&M cell containing frame alignment information and the VPI/VCI, and to transmit the ATM cells;

a second ATM interworking multiplexer that is operational to receive a message identifying the VPI/VCI and the second DS0, to receive the ATM cells with the VPI/VCI, to convert the ATM cells to information for the second DS0 using the frame alignment information, and to transmit the second DS0 to the second ESF/SF system;

a signaling processor that is operational to receive the message from the first ATM multiplexer, to select the VPI/VCI and the second DS0 in response to the off-hook state, to generate and transmit the message to the first ATM multiplexer identifying the first DS0 and the VPI/VCI, and to generate and transmit the message to the second ATM multiplexer identifying the second DS0 and the VPI/VCI;

a first link from the first ATM multiplexer to the signaling processor operational to transfer the messages;

a second link from the second ATM multiplexer to the signaling processor operational to transfer the message; and an ATM routing system that is operational to route the ATM cells between the first ATM multiplexer and the second ATM multiplexer based on the VPI/VCI.

2. The system of claim 1 wherein the first ATM multiplexer and the second ATM multiplexer are operational to correct T1 slips.

3. The system of claim 1 wherein the first ATM multiplexer and the second ATM multiplexer are operational to correct synchronization in frame alignment.

4. The system of claim 1 wherein the first ATM multiplexer and the second ATM multiplexer are operational to handle ATM cell loss.

5. A telecommunications system for routing information in an asynchronous transfer mode (ATM) system with ATM cells that contain a virtual path identification/virtual channel identification (VPI/VCI), wherein the information is from a first DS0 in a first T1 Superframe/Extended Superframe (ESF/SF) system that uses robbed bit signaling and is routed by the ATM system to a second DS0 in a second T1 Superframe/Extended Superframe (ESF/SF) system that uses robbed bit signaling, wherein the first ESF/SF system includes a first switch that sends a route request message to the telecommunications system, wherein the system comprises;

a first ATM interworking multiplexer that is operational to receive a message identifying the first DS0 and the VPI/VCI, to convert the information from the first DS0 into ATM cells with the VPI/VCI, to generate an F5 OA&M cell containing to frame alignment information and the VPI/VCI, and to transmit the ATM cells;

a second ATM interworking multiplexer that is operational to receive a message identifying the VPI/VCI and the second DS0, to receive the ATM cells with the VPI/VCI, to convert the ATM cells to information for the second DS0 using the frame alignment information, and to transmit the second DS0 to the second ESF/SF system;

a signaling processor that is operational to receive the route request message from the first switch, to select the first DS0, the VPI/VCI , and the second DS0 in response to the route request message, to generate and transmit the message to the first ATM multiplexer identifying the first DS0 and the VPI/VCI, and to generate and transmit the message to the second ATM multiplexer identifying the second DS0 and the VPI/VCI;

a first link from the first ATM multiplexer to the signaling processor operational to transfer the message;

a second link from the second ATM multiplexer to the signaling processor operational to transfer the message; and an ATM routing system that is operational to route the ATM cells between the first ATM multiplexer and the second ATM multiplexer based on the VPI/VCI.

6. The system of claim 5 wherein the first ATM multiplexer and the second ATM multiplexer are operational to correct T1 slips.

7. The system of claim 5 wherein the first ATM multiplexer and the second ATM multiplexer are operational to correct synchronization in frame alignment.

8. The system of claim 5 wherein the first ATM multiplexer and the second ATM multiplexer are operational to handle ATM cell loss.

9. A communications system comprising:

an interworking multiplexer operational to receive superframe traffic, generate and transmit information messages in response to the superframe traffic, receive control messages indicating identifiers for asynchronous traffic, interwork the superframe traffic with the asynchronous traffic in response to the control messages, and transmit the asynchronous traffic; and a processor operational to receive the information messages, select the identifiers for the asynchronous traffic in response to the information messages, and generate and transmit the control messages indicating the identifiers.

10. The communications system of claim 9 wherein asynchronous traffic is asynchronous transfer mode traffic and the identifiers are asynchronous transfer mode connections.

11. The communications system of claim 9 wherein the superframe traffic includes extended superframe traffic.

12. The communications system of claim 9 wherein the interworking multiplexer is further operational to monitor signaling in the superframe traffic and wherein the information messages indicate the signaling.

13. The communications system of claim 9 wherein the interworking multiplexer is further operational to transmit frame alignment information in the asynchronous traffic.

14. The communications system of claim 9 further comprising a switch operational to process and transmit the superframe traffic.

15. The communications system of claim 9 further comprising an asynchronous communications system operational to receive the asynchronous communications from the interworking multiplexer.

16. The communications system of claim 9 wherein:

the processor is further operational to select connections in response to the information messages and generate and transmit other control messages indicating the connections; and further comprising:

another interworking multiplexer operational to receive the asynchronous traffic, receive the other control messages indicating the connections, interwork the asynchronous traffic with other superframe traffic in response to the other control messages, and transmit the other superframe traffic.

17. The communications system of claim 16 wherein the interworking multiplexers are further operational to correct slips.

18. The communications system of claim 16 wherein the interworking multiplexers are further operational to correct frame alignment synchronization.

19. The communications system of claim 16 wherein the interworking multiplexers are further operational to handle loss of at least a portion of the asynchronous traffic.

20. The communications system of claim 16 wherein the interworking multiplexers are further operational to perform glare resolution.

21. The communications system of claim 16 wherein the other interworking multiplexer is further operational to interwork the asynchronous traffic with the other superframe traffic using frame alignment information in the asynchronous traffic.

22. The communications system of claim 16 further comprising an asynchronous communications system operational to transfer the asynchronous communications between the interworking multiplexers.

23. The communications system of claim 16 further comprising a switch operational to receive and process the other superframe traffic.

24. A method of operating a communications system, the method comprising:

receiving superframe traffic into an interworking multiplexer;

In the interworking multiplexer, generating and transmitting information messages in response to the superframe traffic;

receiving the information messages into a processor;

in the processor, selecting identifiers for asynchronous traffic in response to the information messages;

in the processor, generating and transmitting control messages indicating the identifiers;

in the interworking multiplexer, receiving the control messages indicating the identifiers;

in the interworking multiplexer, interworking the superframe traffic with asynchronous traffic in response to the control messages; and transmitting the asynchronous traffic from the interworking multiplexer.

25. The method of claim 24 wherein asynchronous traffic is asynchronous transfer mode traffic and the identifiers are asynchronous transfer mode connections.

26. The method of claim 24 wherein the superframe traffic includes extended superframe traffic.

27. The method of claim 24 further comprising in the interworking multiplexer, monitoring signaling in the superframe traffic and wherein the information messages indicate the signaling.

28. The method of claim 24 further comprising transmitting frame alignment information from the interworking multiplexer in the asynchronous traffic.

29. The method of claim 24 further comprising:

processing the superframe traffic in a switch; and transmitting the superframe traffic from the switch.

30. The method of claim 24 further comprising transferring the asynchronous communications from the interworking multiplexer through an asynchronous communications system.

* * * * *